United States Patent [19]

Howe

[11] Patent Number: 5,646,971

[45] Date of Patent: Jul. 8, 1997

[54] METHOD AND APPARATUS FOR THE UNDERWATER LOADING OF NUCLEAR MATERIALS INTO CONCRETE CONTAINERS EMPLOYING HEAT REMOVAL SYSTEMS

[75] Inventor: William F. Howe, Toronto, Canada

[73] Assignee: Hi-Temp Containers Inc., Toronto, Canada

[21] Appl. No.: 341,980

[22] Filed: Nov. 16, 1994

[51] Int. Cl.$^6$ .................................................. G21C 19/06
[52] U.S. Cl. .................................................. 376/272
[58] Field of Search .................................. 376/272, 261, 376/260; 250/506.1, 507.1; 414/146

[56] References Cited

U.S. PATENT DOCUMENTS

| | | | |
|---|---|---|---|
| 2,514,909 | 7/1950 | Strickland | 376/272 |
| 3,229,096 | 1/1966 | Bonilla et al. | 376/272 |
| 3,448,859 | 6/1969 | Hall et al. | 376/272 |
| 4,277,688 | 7/1981 | Yamamoto et al. | 376/272 |
| 4,666,659 | 5/1987 | Lusk et al. | 376/272 |
| 4,800,062 | 1/1989 | Craig et al. | 376/272 |
| 5,102,615 | 4/1992 | Grande et al. | 376/272 |

OTHER PUBLICATIONS

Tech Talk Special Edition brochure dated Oct., 1989 by Ontario Hydro.
Sierra Nuclear Corp. brochure entitled *Ventilated Storage Cask* (no date).
Pacific Nuclear industry flyer dated 1992 entitled *The #1 Choice for Spent Fuel Storage*.
Chem–Nuclear Systems, Inc. brochure (no date).

*Primary Examiner*—Daniel D. Wasil
*Attorney, Agent, or Firm*—Bereskin & Parr; Timothy J. Sinnott

[57] ABSTRACT

Apparatus for the underwater loading of nuclear materials into concrete containers employing heat removal systems includes a holding vessel and a cover. The holding vessel has a metal bottom and a metal outside wall which define an upwardly open cavity dimensioned to accommodate the concrete container while leaving a gap between the container and the outside wall. A cover covers this gap, while allowing access to the central open cavity of the container. Fasteners and seals fasten and seal the cover to the container and the holding vessel. A method for loading nuclear materials into such concrete containers, utilizing the apparatus of the subject invention, includes the steps of lifting the container into the steel vessel, lowering the cover into place, fastening and sealing the cover onto the container and vessel, and then lowering the container and vessel assembly into the water storage pool.

19 Claims, 14 Drawing Sheets

METHOD AND APPARATUS FOR THE UNDERWATER LOADING OF NUCLEAR MATERIALS INTO CONCRETE CONTAINERS EMPLOYING HEAT REMOVAL SYSTEMS

FIELD OF THE INVENTION

The invention relates to methods and apparatus for transferring spent nuclear fuel from water pools to a storage facility.

BACKGROUND OF THE INVENTION

In the operation of nuclear power stations, nuclear fuel encased in metal tubes, known as fuel elements, are burned up inside the nuclear reactor core. Following reactor discharge, the resulting spent fuel elements contain radioactive material which decays, generating large quantities of heat and radiation emissions. The industry practice is to place the spent fuel in water pools located on the station site, given that water has excellent heat removal properties and provides adequate radiation shielding. Long term storage of spent fuel in water pools produces large quantities of loose radioactive material contamination, which remains suspended in the water and deposited on the water pool floor.

Depending on the concentration of the uranium in the fuel and the level of burn-up, the spent fuel elements must remain in water pools for a period varying from 5–10 years, at which point the heat generation is reduced to a level where the fuel elements can be removed and placed in a dry shielded storage facility. The spent fuel is isolated and the radiation emissions must be shielded for a period of several thousand years. Future final disposal is expected to take place once a final underground repository has been located and becomes operable.

Over the years, dry shielded storage technologies have been developed, including containers having a core of steel and lead, such as those in U.S. Pat. No. 3,229,096 to Bonilla et al; U.S. Pat. No. 2,514,909 to Strickland; and U.S. Pat. No. 4,666,659 to Lusk et al. Lead and steel have excellent shielding and heat transfer capabilities. Large quantities of spent fuel can be stored per container while dissipating sufficient heat to ensure that the structural material properties are maintained within acceptable standards and codes.

Containers utilizing steel and lead shielding materials also allow for safe and simple handling. The steel outer surfaces of these containers enable them to be lowered directly into water storage pools for spent fuel loading. The surface material characteristics have been designed to have low surface porosity. The spent fuel elements are transferred directly into the steel and lead containers. The steel and lead shielded lid is fastened onto the container below the surface of the water prior to removing the container from the water storage pool. Underwater fuel loading reduces direct radiation exposure to nuclear power plant workers.

However, prior to transferring the steel and lead containers to the outdoor storage site, large quantities of loose radioactive contamination must be chemically removed from the container outer surface in order to comply with applicable nuclear standards and codes. Thus, storage containers using steel and lead suffer from a significant technical disadvantage, since the chemical decontamination of the outer metal surface exposes the nuclear power plant workers to significant toxic chemicals.

Storage containers using steel and lead also suffer from a significant economic disadvantage, resulting from the high cost of material and fabrication. Since nuclear power plants are now transferring from water storage pools large volumes of spent fuel, the cost of this "old" technology is seen as prohibitive and new lower cost technology has been developed.

In particular, a number of different types of concrete containers have been developed. One concrete container utilizes an inner and outer steel shell and an inner concrete shield. Concrete and steel as a storage container has an economic advantage due to the low cost of material and fabrication relative to lead and steel.

A permanent metal-clad concrete container is described in U.S. Pat. No. 5,102,615 to Armstrong and Grande et al for pool loading applications, and a concrete cask storage system is described in U.S. Pat. No. 4,800,062 to Craig, Haelsig, Kent, Harbor and Schmoker et al for on-site spent fuel storage.

Concrete material as a radiation shield has a technical advantage since it has a high water content, and water is an excellent radiation shield. A further technical advantage of a concrete container with a steel outer surface is that spent fuel elements can be loaded below water in the water storage pools in a similar manner to the steel and lead storage containers.

However, concrete shielded containers which utilize permanent inner and outer steel liners and a concrete inner shield suffer from significant technical disadvantages. The chemical decontamination of the outer metal surface exposes the nuclear power plant workers to significant toxic chemicals. Also, since concrete has poor heat transfer characteristics, these concrete shielded containers tend to exceed acceptable standards and codes when relatively low quantities of heat is generated. Most commercial applications require storage quantities of spent fuel and associated levels of heat generation which exceed the limits of this technology.

With a view to overcoming these limitations, concrete containers employing heat removal systems have been developed. In order to allow for the maximum removal of heat generated from radioactive decay, the outer metal surfaces have been eliminated and air ventilation penetrations to the inner steel liner have been added to permit heat removal. With the addition of the heat removal systems, large quantities of spent fuel can be stored with concrete containers.

Concrete containers utilizing heat removal systems have a significant economic advantage relative to lead and steel material containers for large quantities of spent fuel due to the low costs of material and equipment fabrication.

However, concrete containers with heat removal systems suffer from technical disadvantages. Because the surface material characteristics of concrete include high surface porosity, these containers cannot be lowered directly into the nuclear power plant water pools, without permanently contaminating the pores in the concrete surface and thereby exceeding the codes and standards established for outdoor transfer and storage. A steel and lead storage container must be used as an intermediate transfer containers. This container must be purchased and operated as an intermediate step to move the spent fuel from the water storage pool to the concrete container. The spent fuel elements are loaded into the intermediate transfer containers in a similar manner as the steel and lead material storage containers. Prior to transferring the contents of the transfer containers to the outdoor concrete containers, large quantities of loose radioactive contamination must be chemically removed from the container outer surface. Once decontaminated below the applicable nuclear standards and code levels, the transfer container is moved outdoors and a complex and time consuming transfer is carried out from the transfer container to the concrete shielded container. The empty transfer container is returned to the water pool and the operation is repeated.

A further disadvantage of the concrete containers utilizing heat removal systems is the significant exposure of nuclear power plant personnel to radiation associated with the transfer of spent fuel when conducted outside of the water storage pools and toxic chemicals associated with the chemical decontamination of the steel and lead transfer container.

Yet another disadvantage of conventional concrete containers is that the transfer of spent fuel into concrete containers takes place away from the nuclear power plant, thereby exposing the general public to a risk of significant nuclear radiation.

SUMMARY OF THE INVENTION

The subject invention relates to a method and apparatus for underwater loading of nuclear materials into containers having concrete outer shells, such as those employing heat removal systems.

The subject apparatus is used for the underwater loading of nuclear materials into a concrete container having a concrete outer surface, an open central cavity shaped to receive the nuclear materials, a steel inner liner lining the interior of the cavity, a steel top surface connected to the inner liner, a shielded cavity lid dimensioned to cover the cavity, and fastening and sealing means for fastening and sealing the lid to the top surface. The apparatus comprises (a) holding means for holding the concrete container during underwater loading, comprising a metal bottom, and a metal outside wall having a top surface, wherein the bottom and wall define an upwardly open cavity dimensioned to accommodate the concrete container, while leaving a gap between the container and the outside wall; (b) cover means for covering the gap between the outside wall of the holding means and the concrete outer surface of the container while allowing access to the central open cavity of the container; (c) fastening means for fastening the cover means to the top surface of the container, and for removably fastening the cover means to the top surface of the holding means; and (d) sealing means for sealing the cover means to the container and to the holding means.

The method of the subject invention comprises the steps of: (a) lifting the concrete container into a steel holding vessel having a top surface with an open cavity therein dimensioned to receive the concrete container; (b) lowering a cover, shaped to cover the gap between the holding vessel and the container liner while allowing access to the central cavity; (c) fastening and sealing the cover onto the container and the holding vessel to form a sealed container assembly; (d) lifting the sealed container assembly into a water storage pool containing nuclear material; (e) lifting the nuclear material into the central cavity of the container, while maintaining the nuclear fuel elements under water; (f) fastening a shielded primary lid over the cavity of the container while the container assembly is under water to form a shielded full container assembly; (g) lifting the shielded full container assembly from the water pool; venting the concrete container and draining the water therefrom; (h) removing the cover from the assembly; (i) fastening a secondary sealing lid over the top of the shielded full container; (j) removing the container from the holding vessel; and (k) transporting the container to a storage facility.

The subject method and apparatus offer the following significant advantages over current technology:

1. All transfer of spent fuel is carried out under water in the water storage pools, significantly reducing personnel exposure to radiation.
2. The purchase and operation of intermediate steel and lead storage containers, for transferring from the water pool to concrete containers which employ heat removal systems, are eliminated.
3. The removable steel vessel remains within the contaminated storage pool loading area, thereby reducing personnel handling and exposure to toxic decontamination chemicals and eliminating the possibility of transferring radioactive contamination out of the nuclear power plant operating environment.
4. Nuclear power stations benefit from the low cost of concrete and steel material and fabrication for the storage of large quantities of spent fuel while not suffering from the associated risks and burdens previously associated with concrete containers which employ heat removal systems.

BRIEF DESCRIPTION OF THE DRAWINGS

The present invention will now be described below, by way of an example only, with reference to the following drawings, in which.

DETAILED DESCRIPTION OF THE PREFERRED EMBODIMENT

Figures 1, 1A, 2:
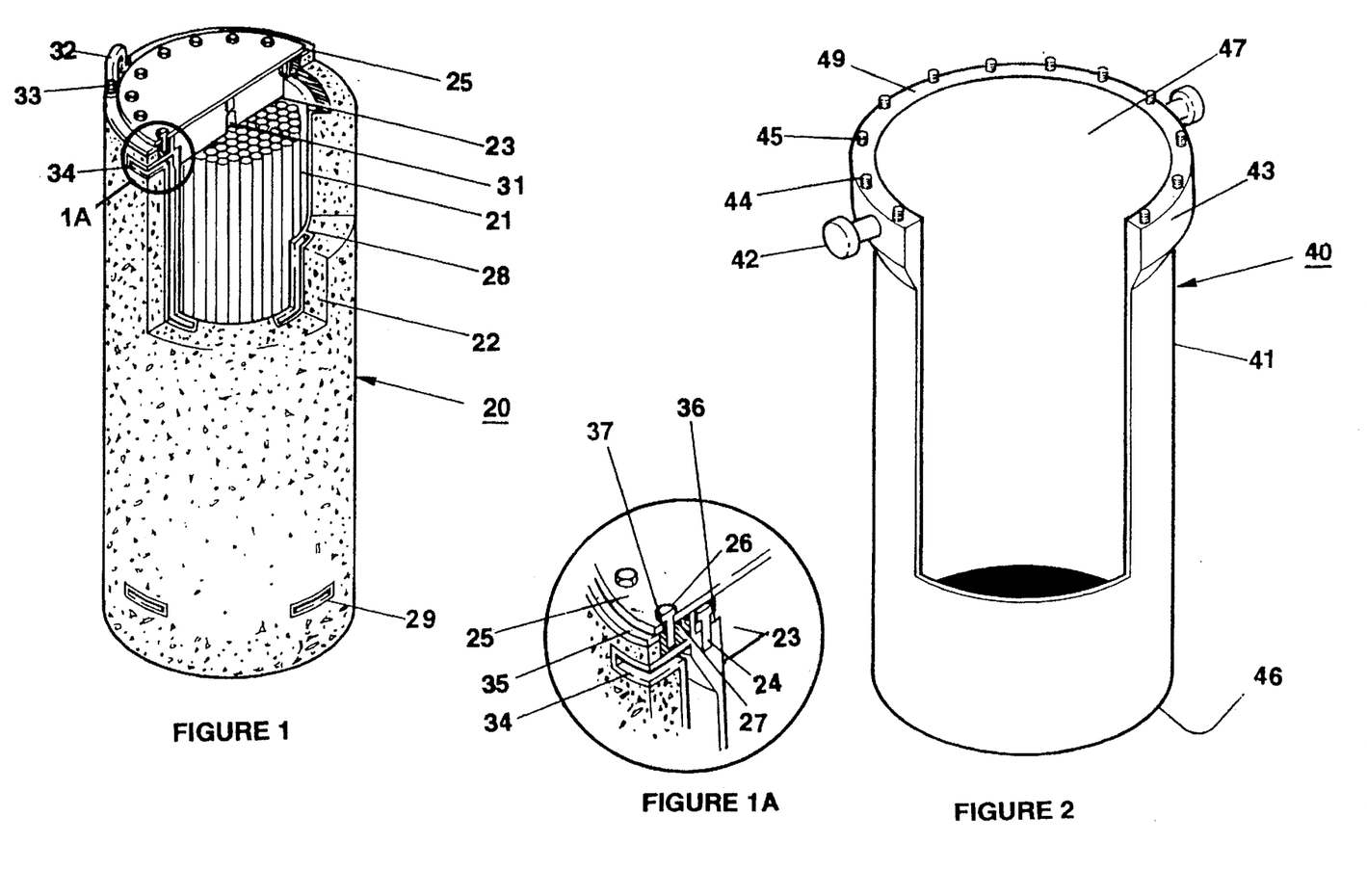
FIG. 1 is a perspective view of a concrete container employing a heat removal system, partially broken away to showing the spent fuel contents and the container internal and external components.
FIG. 1A is a detailed perspective view of a portion of the concrete container, illustrated in FIG. 1.
FIG. 2 is a perspective view of a preferred embodiment of one component of the subject invention, namely the steel holding vessel.

FIGS. 1 and 1A illustrate a concrete container 20 employing a heat removal system, namely a convection air cooling system, which is adapted for use with the apparatus and method of the subjection invention. Container outer shell 22 is of concrete material of varying thickness, which provides adequate radiation shielding from the radiation resulting from radioactive decay.

The primary lid or plug 23 is of steel material of varying thickness to provide radiation shielding of the spent nuclear fuel elements 21. The primary lid 23 is of sufficient size to extend over the inner cavity of container 20 to provide a sealing contact surface between the lower surface of the lid and the top surface of the concrete container.

Container 20 has a central cavity lined with steel inner liner 28, which comprises a bottom plate, an inner sidewall for maintaining a metal surface between the water and the concrete shell 22, and a steel rim 35. The inner sidewall of liner 28 has a flat top surface 36 for receiving primary lid 23. Top surface 36 includes a ring of bolt holes spaced to receive bolt 24. Steel rim 35 has a flat top surface 37 for receiving secondary lid 25. Top surface 37 contains a ring of bolt holes spaced for receiving bolts 26. Lifting lugs 32 coupled to the perimeter of top plate 35 by bolts 33 allow container 20 to be raised and lowered into place by a suitable crane.

The heat generated from radioactive decay is removed from inner steel liner 28 by air convection through a number of ventilation pipes 29 and other pipes 34 located at a number of areas around the circumference of container 20.

According to industry practice, spent fuel elements are typically stored in spent fuel baskets underwater in the storage pools. A vent intake and drain 31 are provided to remove water from the inner cavity of the container following the loading of the fuel.

As best shown in FIG. 1A, sealing of primary lid 23 is accomplished through a combination of closure bolts 24 and gaskets (not shown), to ensure that after draining of water from the container and fuel contents, an atmosphere of inert gas is maintained to protect the spent fuel from oxygen. The secondary lid 25 is a steel plate of sufficient size as to extend over the upper surface of the container and is sealed through a combination of bolts 26 and gaskets 27.

FIG. 2 illustrates the holding means of the preferred embodiment of the invention, in the form of steel holding vessel 40. Vessel 40 is fabricated from stainless steel and comprises a steel bottom 46, a thin steel cylindrical side wall 41 with A reinforced top portion 43, and an open central cavity 47. Diametrically opposed lifting trunnions 42 extend outwardly from top portion 43. Side wall 41 has a flat top surface 49, provided with a ring of circumferentially spaced studs 45 extending upwardly therefrom. The outer surface of vessel side wall 41 is polished to assist in the ease of periodic cleaning.

Figure 3A:
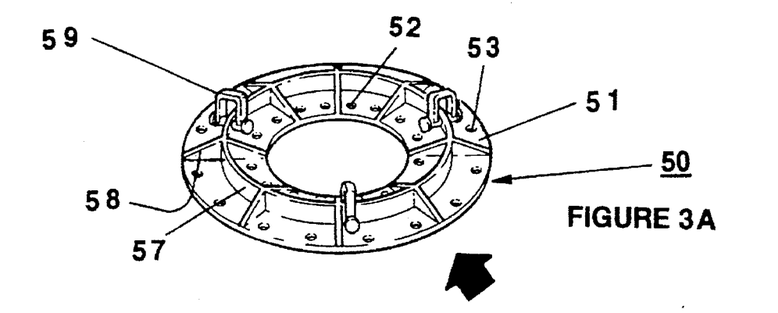
FIG. 3A is a top perspective view of another component of the preferred embodiment, namely the annular cover.
Figure 3B:
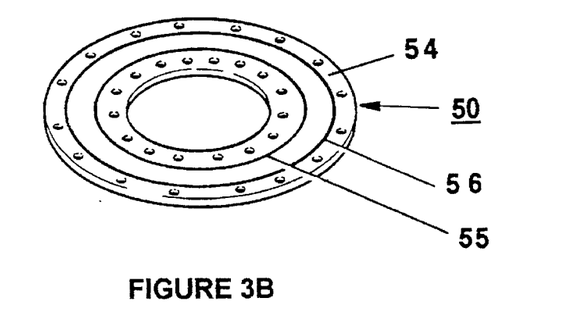
FIG. 3B is a bottom perspective view of the annular cover, depicting its lower gaskets and sealing surface.

Referring now to FIGS. 3A and 3B, the preferred embodiment of the invention also comprises cover means in the form of an annular cover 50, and fastening means for fastening cover 50 to container 20 and vessel 40. Annular cover 50 has an upper surface 51 shown in FIG. 3A and a lower surface 54 shown in FIG. 3B.

Cover 50 is shaped to cover the gap between container 20 and the outside wall of holding vessel 40, to prevent contaminated water from coming into contact with the concrete outside surface of container 20. At the same time, the annular shape of cover 50 provides access to the central cavity of container 20.

The fastening means comprises an inner ring of bolt holes 52 spaced to receive bolts 26 and an outer ring of bolt holes 53 spaced to couple with studs 45 on the top of holding vessel 40.

Bottom surface 54 of annular cover 50 includes an inner gasket ring 55 and an outer gasket ring 56, which ensure sealing of the concrete surfaces from the contaminated water pool. Inner gasket ring 55 is dimensioned to mate with the top surface 37 of container 20. Outer gasket ring 56 is dimensioned to mate with sealing surface 49 of holding vessel 40.

Upper surface 51 of cover 50 includes a reinforcing ring 57 having spaced radially extending ribs 58. Lifting lugs 59 are mounted on ring 57.

Figure 4:
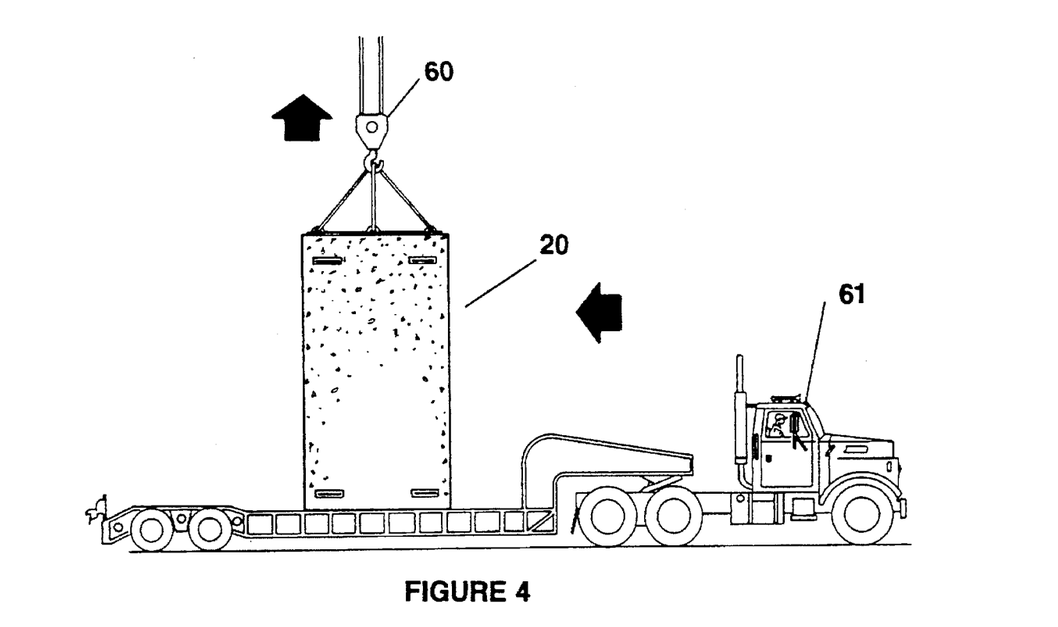
FIG. 4 is a side elevational view of a concrete container being lowered onto a transporter in preparation for delivery into a nuclear power station.

Concrete containers 20 may be fabricated at the nuclear power plant or at fabrication facilities off-site. Once fabricated and delivered, containers 20 are performance tested prior to live loading conditions. Once all performance tests are completed the containers are ready for loading. FIG. 4 shows a concrete container 20 being lowered by crane 60 onto a transporter 61 in preparation for delivery into the nuclear power station.

Figure 5:
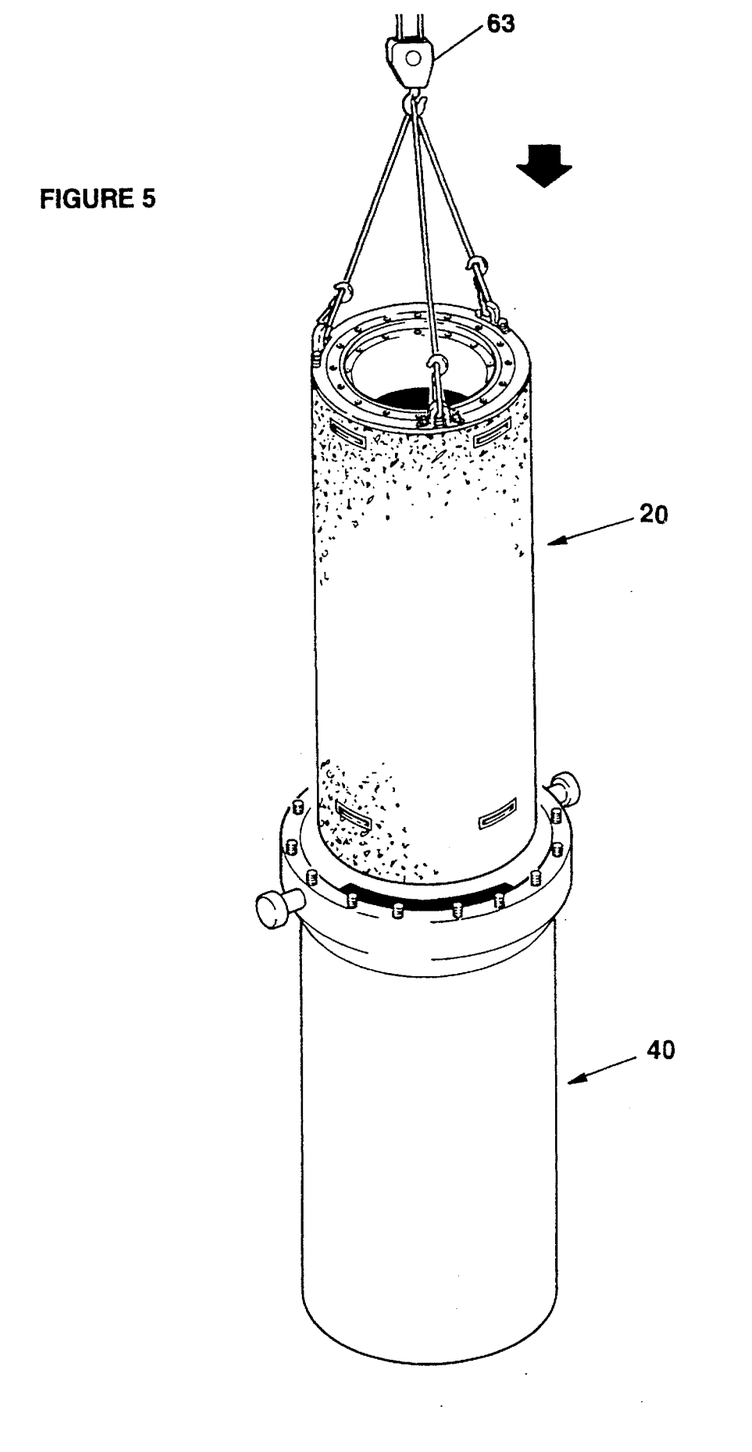
FIG. 5 is a perspective view showing a concrete container being lowered into the steel holding vessel of the subject invention.

Referring now to FIG. 5, once inside the nuclear power station, concrete container 20 must be lifted by storage pool crane 63 from the transporter 61 and lowered into holding vessel 40 of the subject invention, which is located in an area adjacent to the spent fuel water pool. Prior to lowering container 20 into vessel 40, primary lid 23 and secondary lid 25 are removed and placed to the side for later use.

Figure 6:
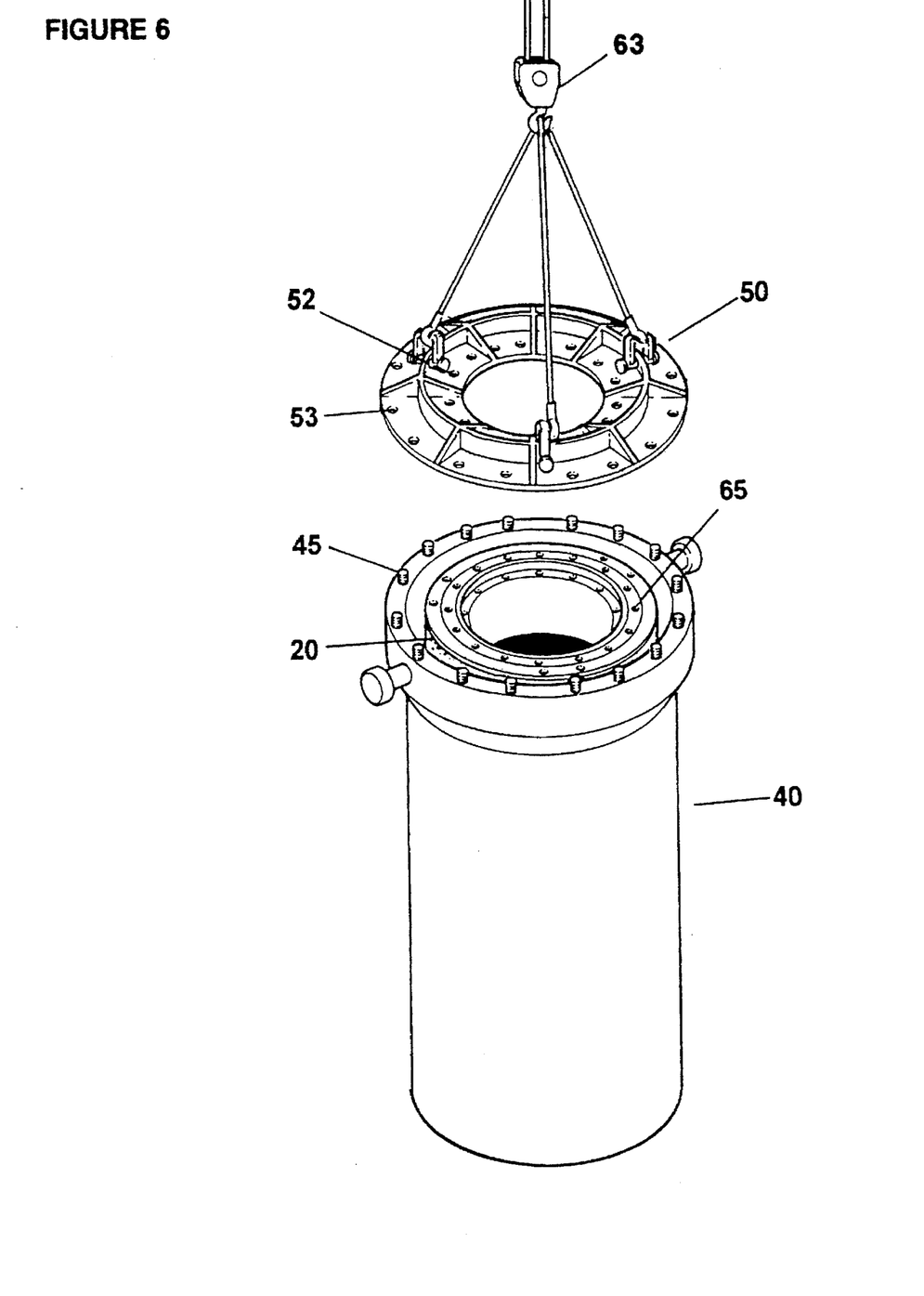
FIG. 6 is a perspective view showing the cover being lowered onto the holding vessel containing a concrete container.

FIG. 6 depicts annular cover 50 of the subject invention being lowered by crane 63 onto holding vessel 40 containing an open concrete container 20.

Figure 7:
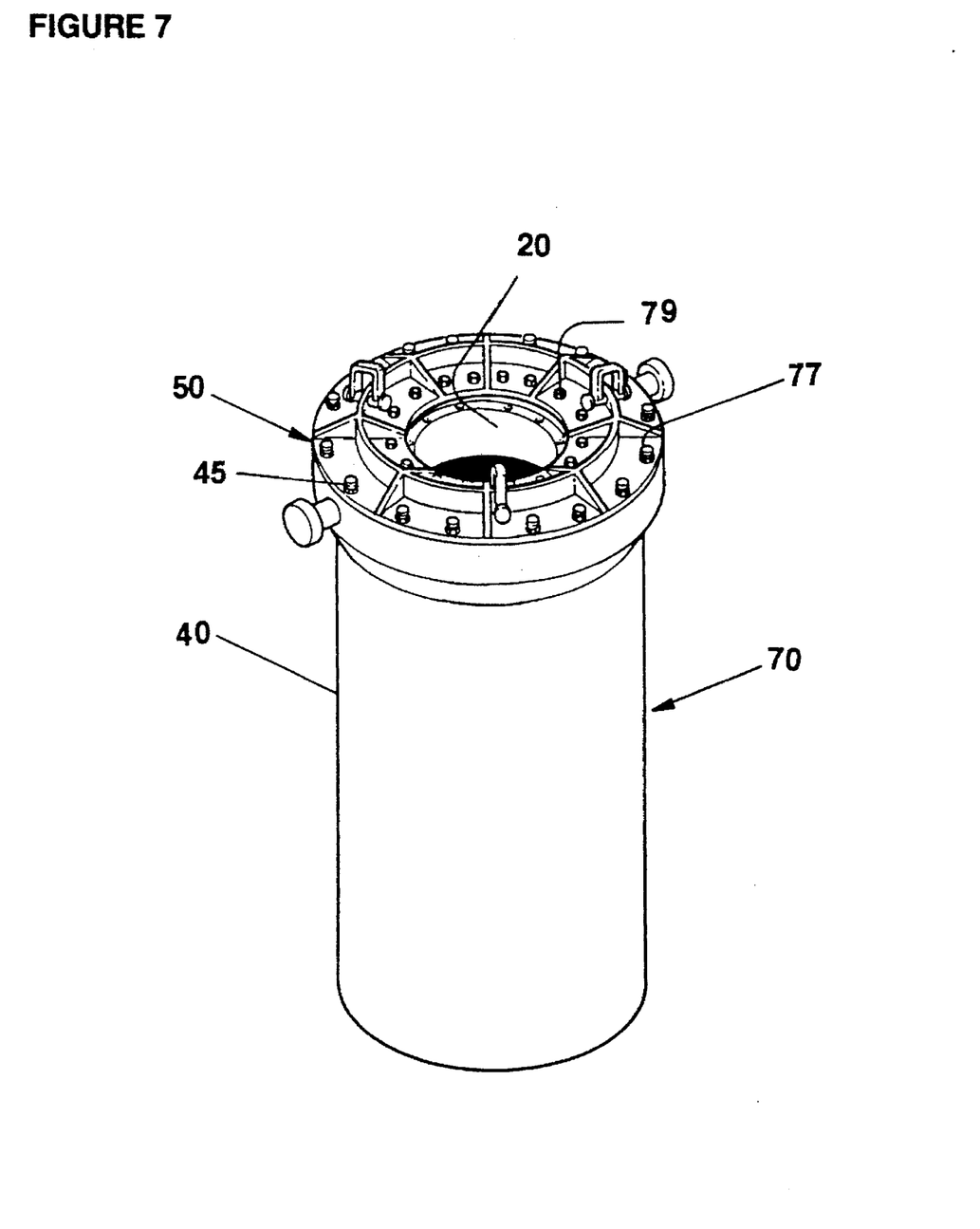
FIG. 7 is a perspective view showing the cover coupled to the holding vessel.

As shown in FIG. 7, cover 50 is fastened onto container 20 by inserting bolts 79 through bolt holes 52 in outer top surface 36 of container 20 into ring of bolt holes 65 in container 20, thereby deforming inner gasket 55. Cover 50 is fastened onto holding vessel 40 by registering ring of bolt holes 53 with studs 45 and threading nuts 77 onto studs 45, thereby deforming outer gasket 56. Tests are then carried out to ensure that a seal is created between container 20 and outer steel vessel 40. The assembly made up of cover 50 mounted in place on removal vessel 40 containing concrete container 20 is referred to hereinafter as the sealed container assembly 70. Once the sealing test is confirmed, the sealed container assembly 70 is ready for pool loading.

Figure 8:
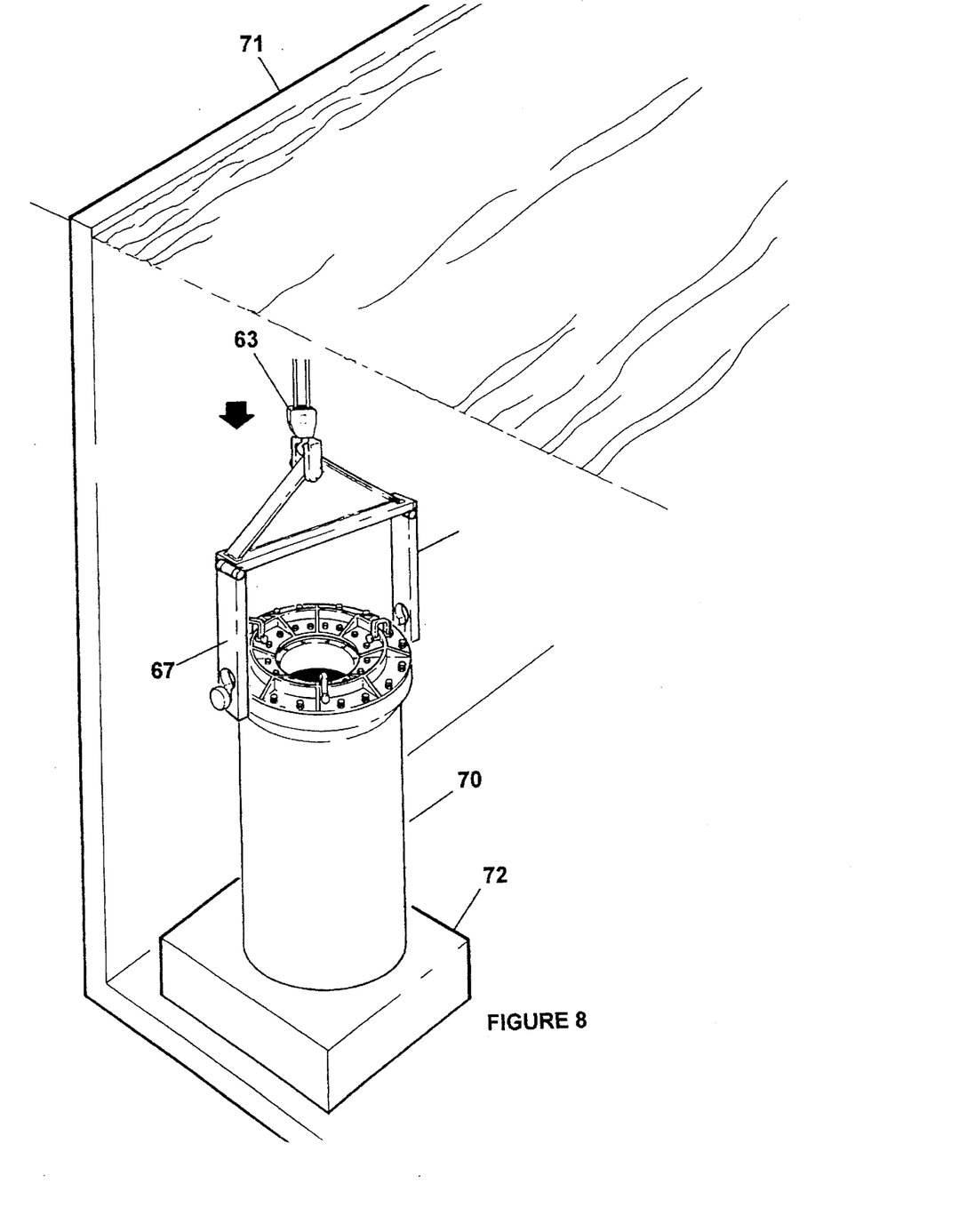
FIG. 8 is a perspective view showing sealed concrete container being lowered into the nuclear power plant spent fuel storage pool.

Referring now to FIG. 8, container assembly 70 is lifted by spent fuel storage pool crane 63 having lifting frame 67 adapted to couple with lifting trunnions 42 on removal vessel 40. Sealed container assembly 70 is lowered into water storage pool 71 so that it rests on pad 72. Once assembly 70 is in the water storage pool, the container lifting frame 67 is placed adjacent to spent fuel water pool 71.

Figure 9:
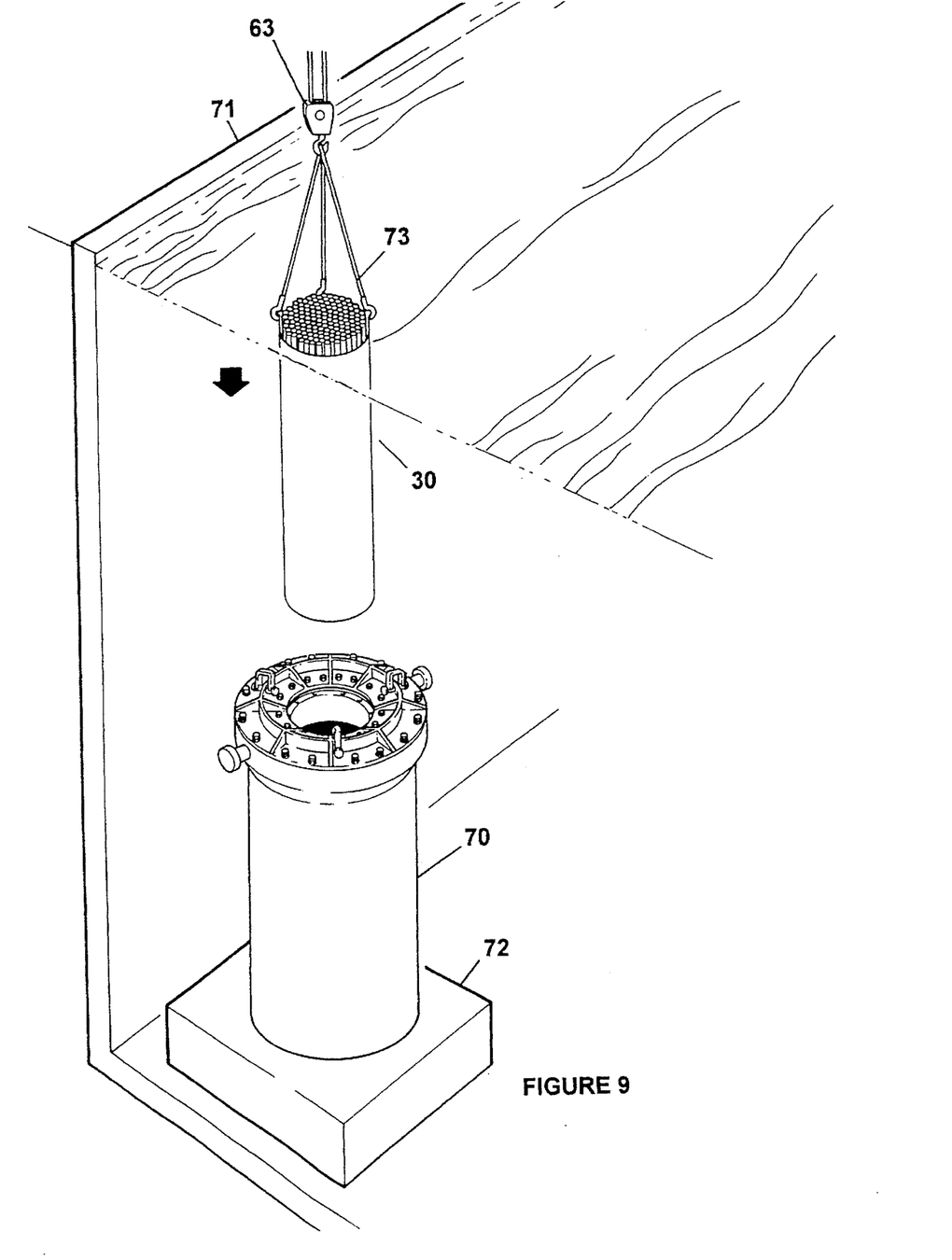
FIG. 9 is a perspective view showing a typical spent fuel basket being loading into a sealed concrete container within the spent fuel water pool.

As shown in FIG. 9, storage pool crane 63 is then coupled to a spent fuel basket/lid lifting harness 73 located in an area adjacent to the storage pool and used to lower harness 73 into the storage pool 71. The crane 63 and harness 73 lift spent fuel basket 30 and transfer the basket to the area of the sealed container assembly 70, maintaining the assembly well below the surface of the water. Basket 30 containing spent fuel elements 21 is then lowered into the middle of sealed container assembly 70.

Figure 10:
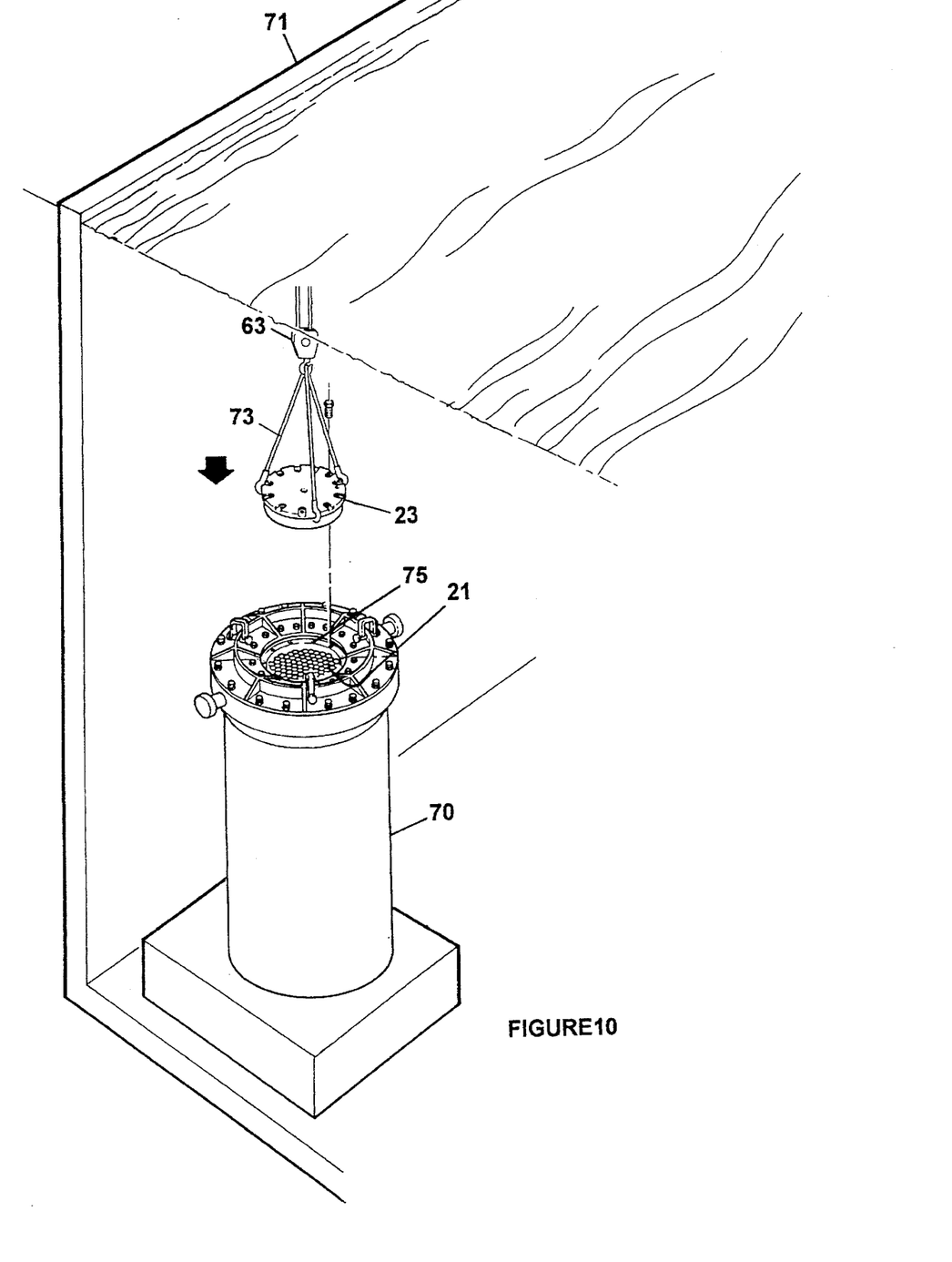
FIG. 10 is a perspective view showing the shielded primary lid being lowered onto the concrete storage container within the spent fuel water pool.

As shown in FIG. 10, once the container assembly 70 is loaded with spent fuel 21, the storage pool crane 63 and lifting harness 73 lift shielded primary lid 23 from an area adjacent from storage pool 71 and lower primary lid 23 onto the sealed container assembly 70. Lid locating studs 75 ensure proper placement of primary lid 23 and protection of the inner bolt arrangements. Storage pool crane 63 then places the lifting harness 73 in an area adjacent to the storage pool 71. The primary lid bolts (not shown) are then fastened by a remote fastening device, to provide radiation shielding when container 20 is removed from water pool 71.

Figure 11:
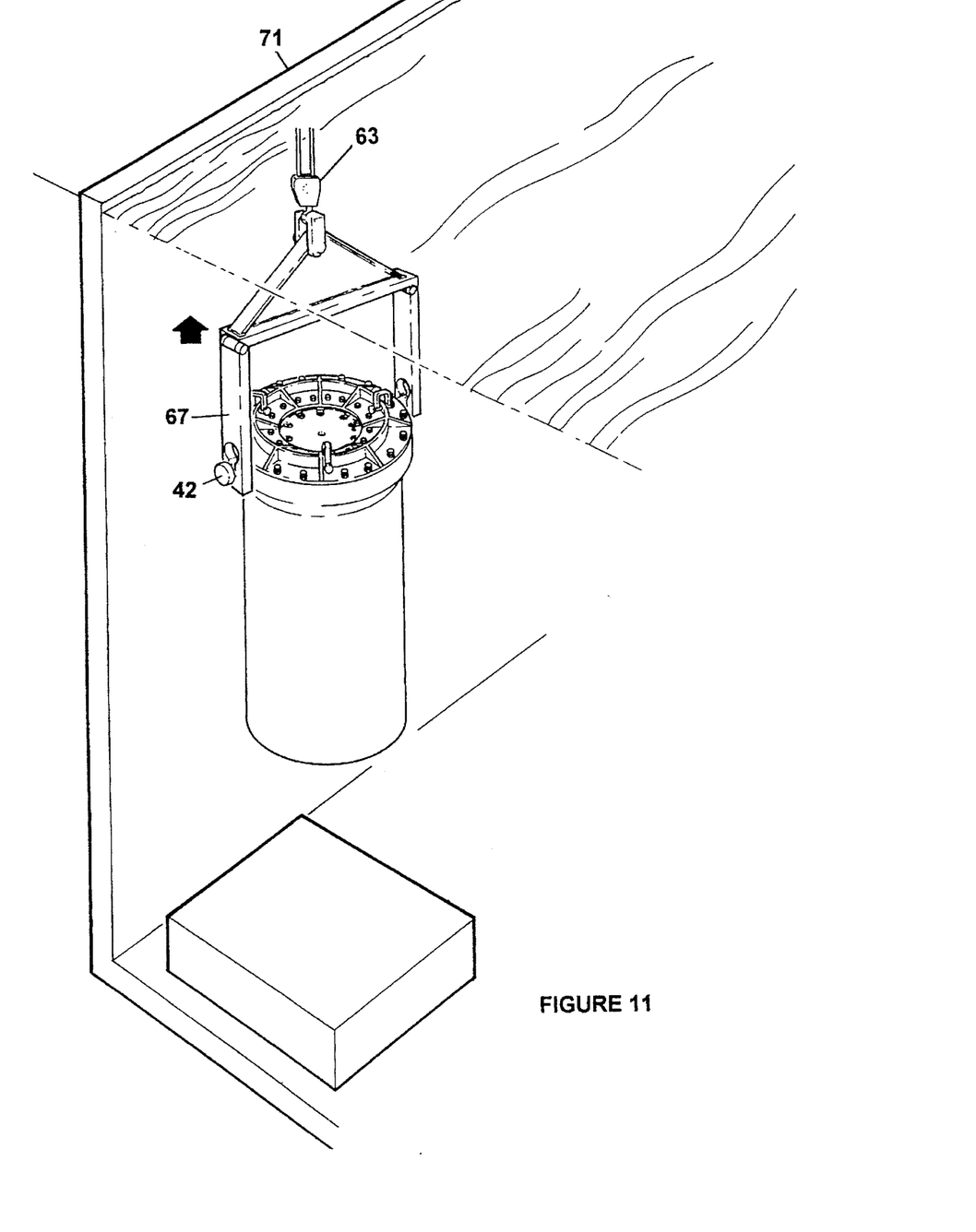
FIG. 11 is a perspective view showing the concrete storage container containing spent fuel being raised from the spent fuel water pool.

Referring to FIG. 11, storage pool crane 63 lifts container lifting frame 67 from an area adjacent to the spent fuel storage pool and lowers it over the trunnions 42 on removal vessel 40. Crane 63 then slowly lifts the now loaded sealed container assembly 70 from the water storage pool, while radiation measurements are taken to ensure that primary lid 23 remains securely fastened to the container. Container 20 is then drained of water from drain port 31 located in the centre of the shielded lid 23, and crane 63 places the lifting frame 67 in an area adjacent to storage pool 71.

Figure 12:
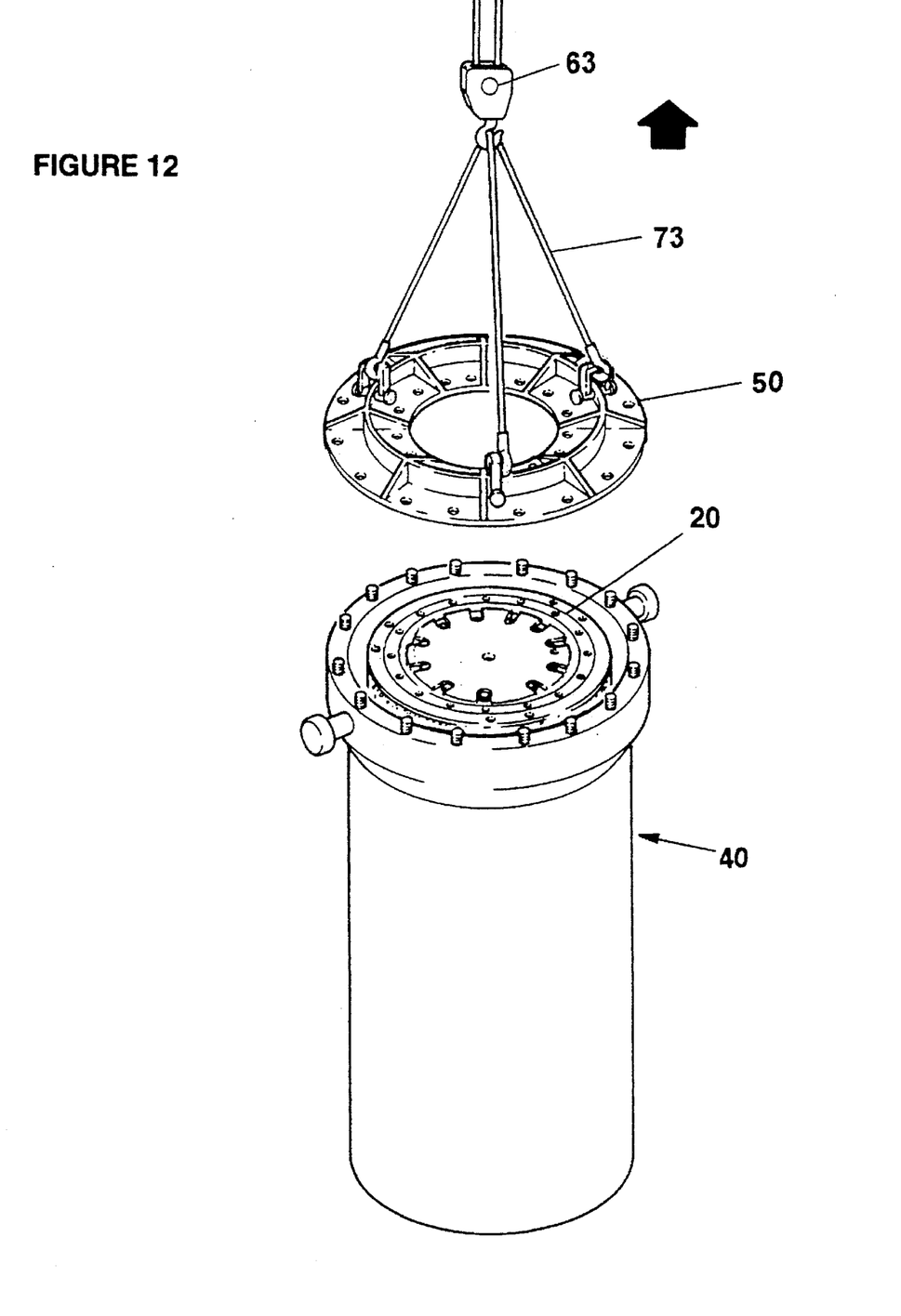
FIG. 12 is a perspective view showing the annular cover being removed from the concrete storage container outside of the spent fuel storage pool.

Referring now to FIGS. 12 and 7, once container 20 is drained of water and that a dew point measurement confirms that the moisture present in the cavity of container 20 is below acceptable limits, annular cover 50 is unfastened from vessel 40 and container 20 by loosening bolts 79 and nuts 77 from studs 45. Storage crane 63 with attached lifting harness 73 then lifts cover 50 away from both the storage container 20 and the holding vessel 40, and places it in an area adjacent to storage pool 71.

Figure 13:
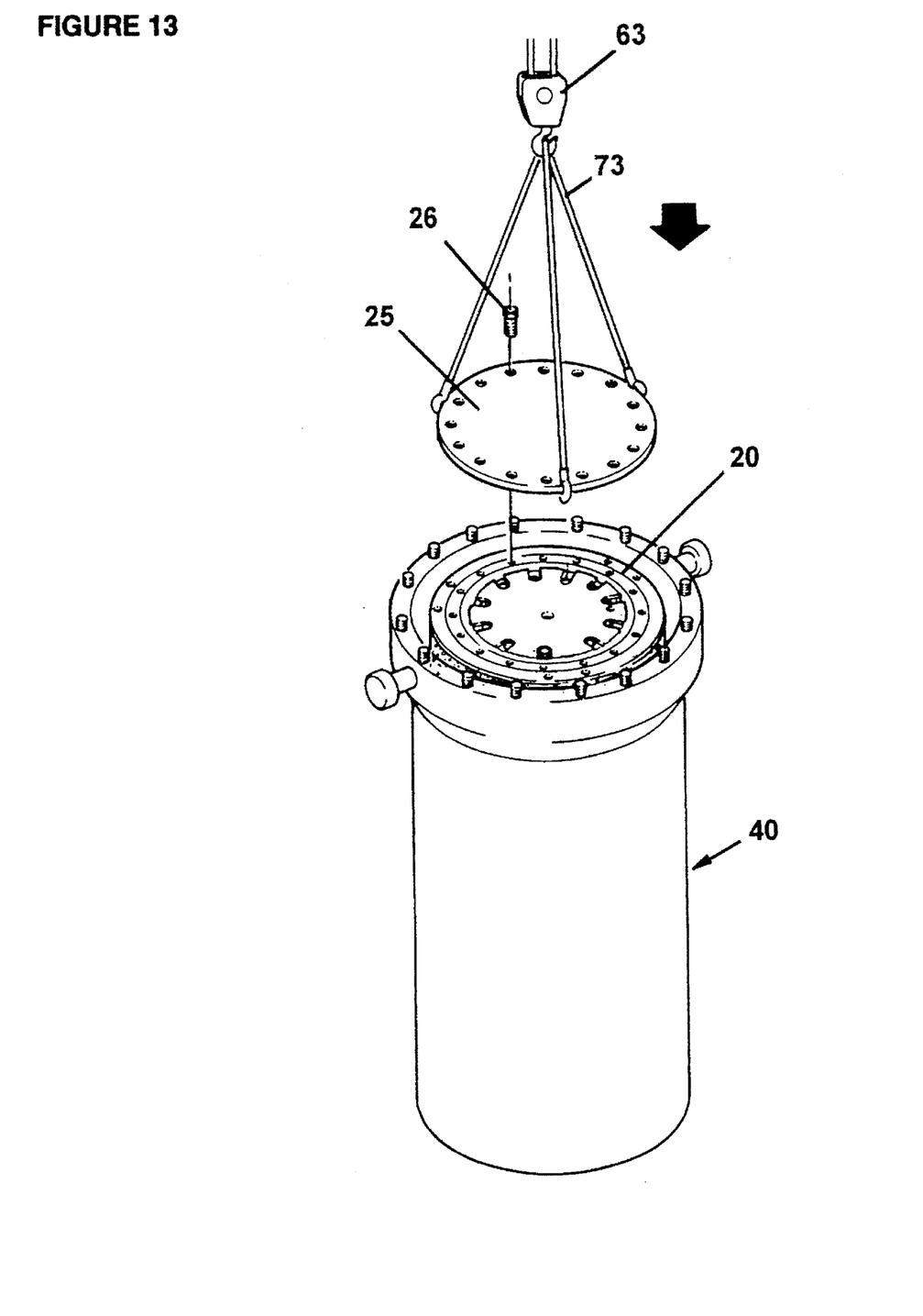
FIG. 13 is a perspective view showing the lowering of a secondary sealing lid being lowered onto the concrete storage container.

FIG. 13 depicts the lowering of secondary sealing lid 25 onto concrete storage container 20. Storage pool lifting crane 63 lifts secondary lid 25 and gaskets from an area adjacent to the storage pool and lowers it onto the storage container 20. Bolts 26 are then tightened into place and the gaskets are checked.

Figure 14:
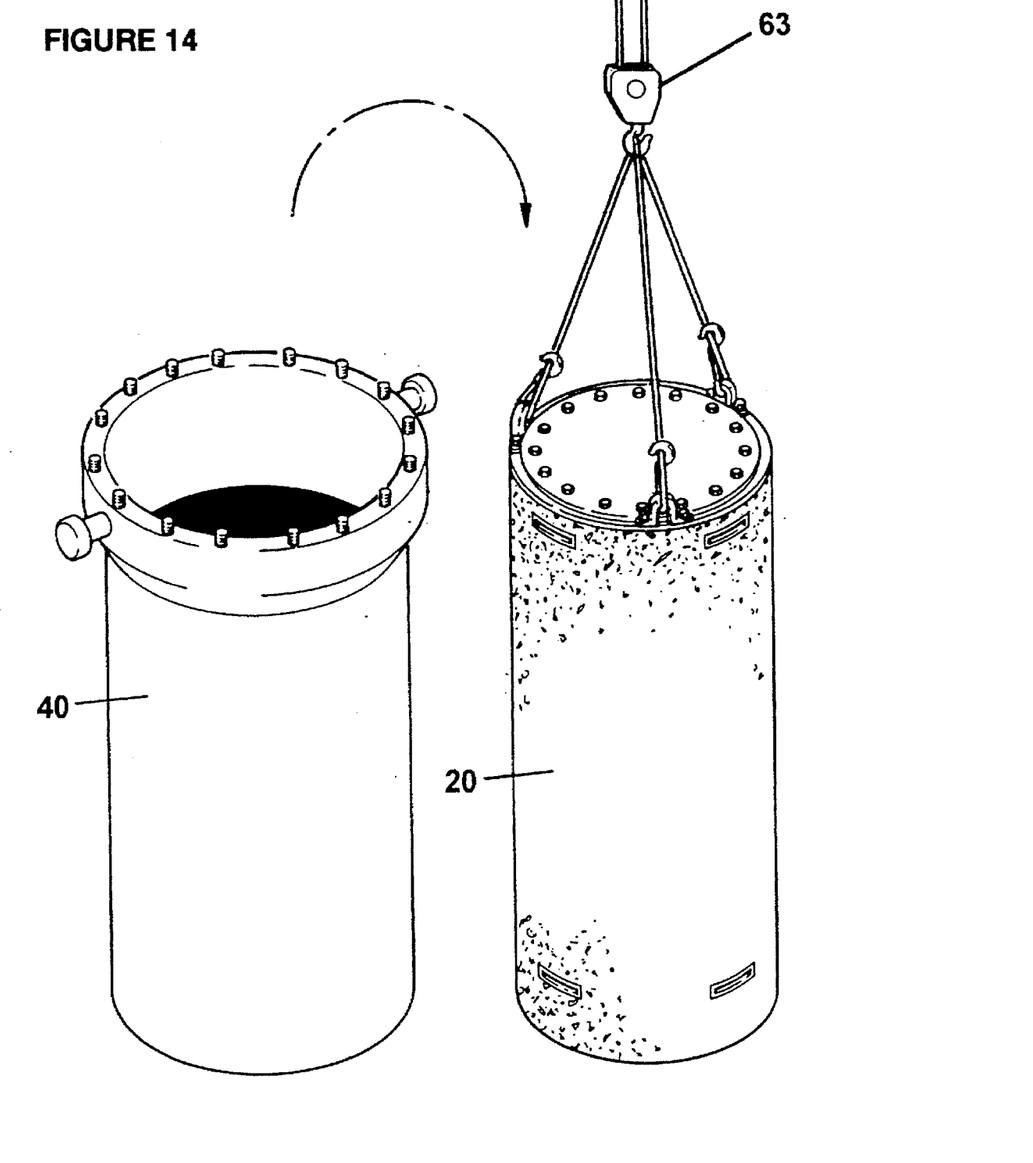
FIG. 14 is a perspective view showing the concrete storage container, loaded with spent fuel and sealed with a primary shield lid and secondary sealing lid being removed from the steel holding vessel of the invention.

As shown in FIG. 14, once concrete container 20 has been confirmed to be leak tight and the radiation levels are confirmed to meet acceptable codes and standards, storage container 20 is removed from steel holding vessel 40 by crane 63.

Figures 15, 16:
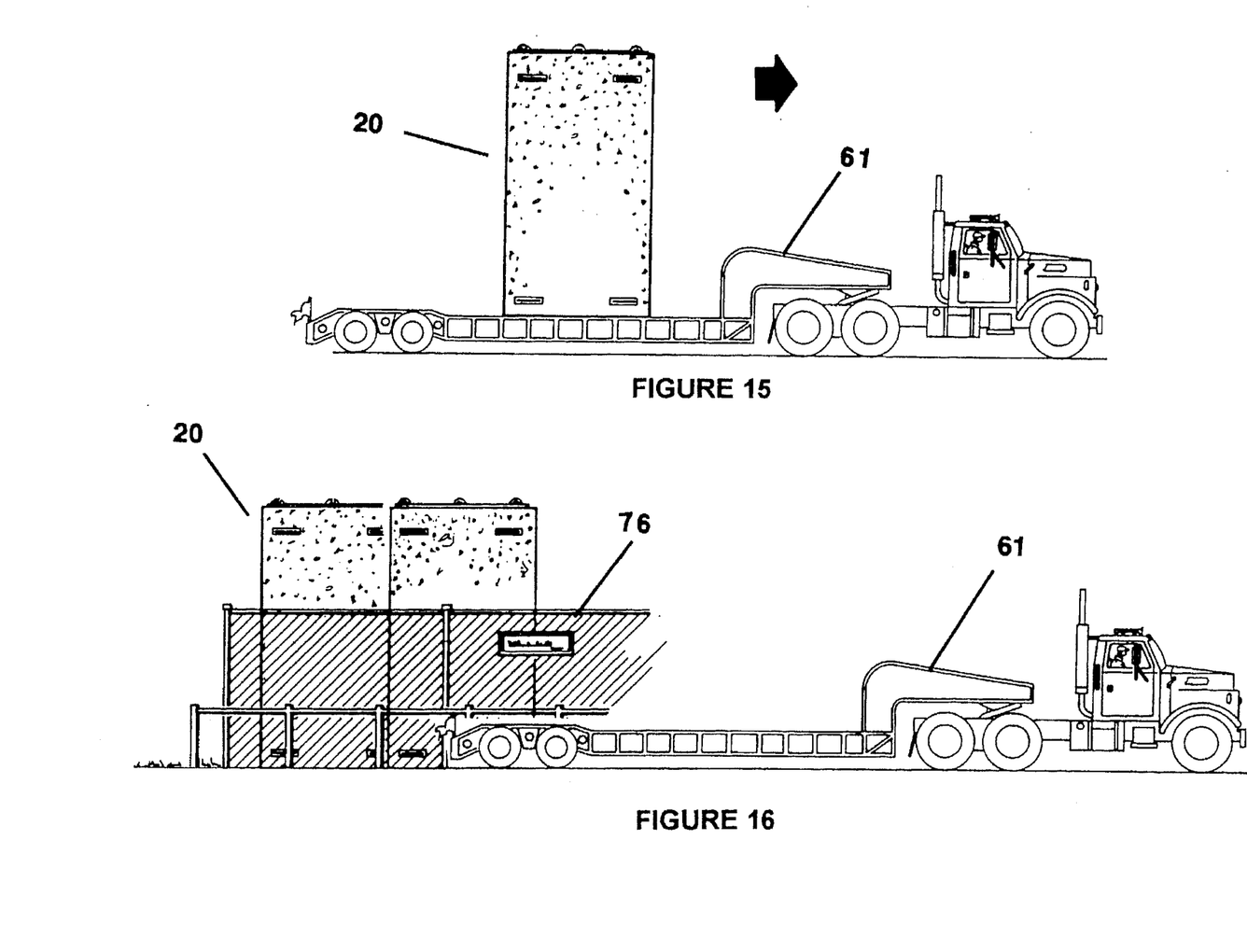
FIG. 15 is a side elevational view showing a concrete container loaded with spent fuel loaded onto a transporter in preparation for delivery out of the nuclear power station.
FIG. 16 is a side elevational view showing the loaded concrete storage container removed from the transporter and placed in an outdoor fenced storage area.

Referring now to FIG. 15, concrete container 20 and its contents are placed on transporter 61, removed from the nuclear power plant and transported to an outdoor storage area. Holding vessel 40 and annular cover 50 are stored adjacent to water storage pool 71 and reused for future loading operations.

As shown in FIG. 16, transporter 61 transfers container 20 to an outdoor fenced storage area 76. Transporter 61 then returns to the loading area to receive another empty container 20, and repeat the above procedure.

The subject invention allows concrete containers which employ heat removal systems to be lowered into water contaminated with radioactive material and reusable. The invention reduces radiation and toxic chemical exposure to employees, and eliminates costly additional transfer systems and time consuming handling operations. The subject apparatus reduces risk associated to personnel and to the general public associated with the transfer of radioactive material outside of the nuclear power plant. Nuclear power plants will also benefit from the reduced risk associated to personnel and the general public associated with the transfer of radioactive material outside of the nuclear power plant.

Figure 17A:
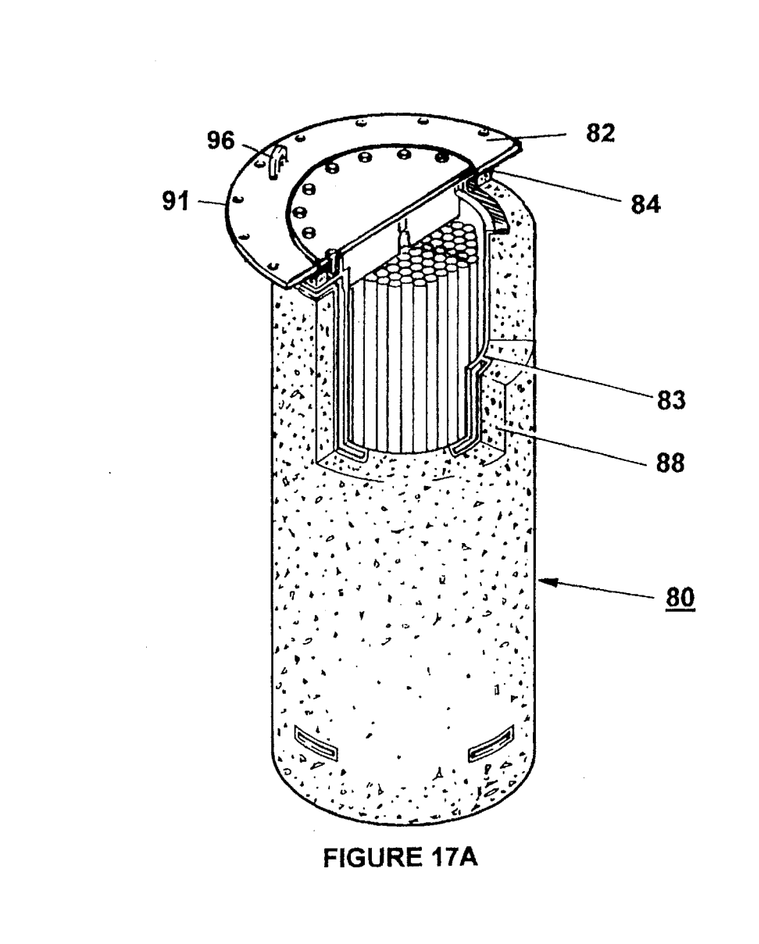
FIGS. 17A and 17B are perspective views of an alternative embodiment of the subject invention.
Figure 17B:
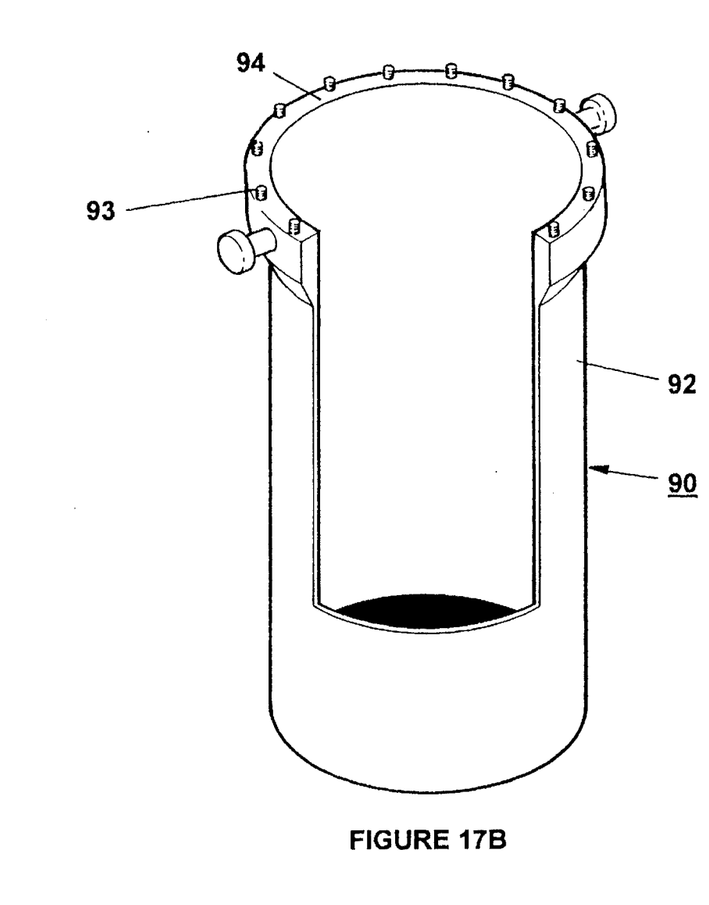

Referring now to FIG. 17, in an alternative embodiment of the invention, the cover means comprises an annular extension 82 of steel rim 84 of steel liner 83 of container 80. Annular extension 82 extends laterally outwardly a sufficient distance to cover the gap between the concrete surface 88 of container 80 and the outside wall 92 of vessel 90, which is identical to vessel 40. Bolt holes 91 in rim extension 82 are dimensioned and spaced to mate with studs 93 extending upwardly from top surface 94 of outside wall 92 of vessel 90. Lifting lugs 96 are used to lift container 80 into vessel 90.

Alternatively, the cover means of the alternative embodiment could take the form of an annular plate or flange welded to the perimeter of the steel rim of the container liner.

Other changes can be made to embodiments illustrated and described herein, while remaining within the spirit and scope of the present invention. For example, while the holding vessel and cover have circular geometry to accommodate concrete containers having circular cross-sections, the vessel and cover could be shaped to accommodate containers having square or other non-circular cross-sections.

Further, the subject invention can also be used with concrete containers which do not employ convection air cooling for the purpose of heat removal. One such heat removal technology applied to concrete containers employs sealed pipes partially filled with fluids which evaporate and recondense at low temperatures. It should also be apparent that the subject invention can be used to transport non-steel clad concrete containers which do not employ heat removal systems.

It should therefore be understood that various changes can be made to the embodiments described herein, without departing from the subject invention, the scope of which is defined by appended claims.

I claim:

1. Apparatus for the underwater loading of nuclear materials into a concrete container having a concrete outer surface, an open central cavity shaped to receive the materials, a steel inner liner lining the interior of the cavity, the liner including a top surface covering the top of the container, a shielded cavity lid dimensioned to cover the cavity, and fastening and sealing means for fastening and sealing the lid to the top surface, the apparatus comprising:
    (a) holding means for holding the concrete container during underwater loading, comprising a metal bottom, and a metal outside wall having a top surface, wherein the bottom and wall define an upwardly open cavity dimensioned to accommodate the concrete container, while leaving a gap between the container and the outside wall;
    (b) cover means for covering the gap between the outside wall of the holding means and the concrete outer surface of the container while allowing access to the central open cavity of the container;
    (c) fastening means for fastening the cover means to the top surface of the container, and for removably fastening the cover means to the top surface of the holding means; and (d) sealing means for sealing the cover means to the container and to the holding means.

2. The apparatus defined in claim 1, wherein the holding means comprises a steel holding vessel having a cylindrical side wall.

3. The apparatus defined in claim 2, wherein the cover means comprises an annular cover having a central aperture which registers with the open cavity of the container.

4. The apparatus defined in claim 3, wherein the side wall of the holding vessel is selected so that the top surface of the holding means is flush with the top surface of the container when the container is placed in the holding means.

5. The apparatus defined in claim 1, where the holding means also comprises lift means for facilitating lifting of the holding means.

6. The apparatus defined in claim 4, wherein the fastening means comprises cover fastening means and vessel fastening means.

7. The apparatus defined in claim 6, wherein the cover fastening means comprises a ring of bolt holes spaced around the inside diameter of the annular cover spaced to match a circular ring of spaced bold holes in the top surface of the container.

8. The apparatus defined in claim 7, wherein the vessel fastening means comprises a ring of spaced studs extending around the perimeter of the top surface of the holding vessel, and a ring of matching bolt holes around the outside diameter of the annular cover.

9. The apparatus defined in claim 3, wherein the sealing means comprises a first sealing ring on the bottom surface of the cover, positioned to bear against the top surface of the holding vessel, and a second sealing ring of smaller diameter on the bottom surface of the cover positioned to contact the steel top surface of the container.

10. The apparatus defined in claim 5, wherein the lift means comprises a pair of diametrically opposed lifting trunnions extending outwardly from the holding means.

11. The apparatus defined in claim 3, wherein the annular cover includes cover lifting means for lifting the cover onto the holding vessel.

12. The apparatus defined in claim 11, wherein the cover lifting means comprises a plurality of symmetrically spaced lifting lugs projecting from the top surface of the cover.

13. The apparatus defined in claim 3, wherein the annular cover is steel.

14. The apparatus defined in claim 1, wherein the cover means comprises an annular plate rigidly fastened to the top surface of the container liner, the annular plate projecting laterally outwardly a selected distance to cover the gap between the container and the holding means.

15. The apparatus defined in claim 14, wherein the annular plate has a bottom sealing surface which mates with the top surface of the holding means.

16. The apparatus defined in claim 15, wherein the annular plate includes a ring of bolt holes adapted to receive a ring of studs projecting upwardly from the top surface of the holding means.

17. The apparatus defined in claim 14, wherein the annular plate includes container lifting means for lifting the container into the holding means.

18. Apparatus for the underwater loading of nuclear materials, comprising:

(a) a concrete container having a concrete outer surface, an open central cavity shaped to receive the materials, an inner steel liner lining the interior of the cavity, the liner including a top surface covering the top of the container, a shielded cavity lid dimensioned to cover the cavity, and fastening and sealing means for fastening and sealing the lid to the top surface;

(b) holding means for holding the concrete container during underwater loading, comprising a metal bottom, and a metal outside wall having a top surface, wherein the bottom and wall define an upwardly open cavity dimensioned to accommodate the concrete container, while leaving a gap between the container and the outside wall;

(c) cover means for covering the gap between the outside wall of the holding means and the concrete outer surface of the container while allowing access to the central open cavity of the container;

(d) fastening means for fastening the cover means to the top surface of the container, and for removably fastening the cover means to the top surface of the holding means; and (e) sealing means for sealing the cover means to the container and to the holding means.

19. The apparatus defined in claim 18, wherein the cover means comprises an annular extension of the top surface of the container liner, the extension projecting laterally outwardly a selected distance to cover the gap between the container and the holding means.

* * * * *